United States Patent
Brown et al.

(10) Patent No.: US 10,728,257 B2
(45) Date of Patent: Jul. 28, 2020

(54) PROFILE-BASED DASHBOARD SYSTEM

(71) Applicant: SAP SE, Walldorf (DE)

(72) Inventors: Andrew Brown, Paris (FR); Alexandre Fortin, Paris (FR); Louis Rakotoarivony, Verrieres le Buisson (FR)

(73) Assignee: SAP SE, Walldorf (DE)

( * ) Notice: Subject to any disclaimer, the term of this patent is extended or adjusted under 35 U.S.C. 154(b) by 279 days.

(21) Appl. No.: 16/033,614

(22) Filed: Jul. 12, 2018

(65) Prior Publication Data

US 2020/0021599 A1  Jan. 16, 2020

(51) Int. Cl.
*H04L 29/06* (2006.01)
*G06F 16/955* (2019.01)

(52) U.S. Cl.
CPC .......... *H04L 63/105* (2013.01); *G06F 16/955* (2019.01); *H04L 63/102* (2013.01)

(58) Field of Classification Search
None
See application file for complete search history.

(56) References Cited

U.S. PATENT DOCUMENTS

| | | | | |
|---|---|---|---|---|
| 2010/0198649 A1* | 8/2010 | Appleyard | ............. | G06Q 10/10 705/7.12 |
| 2010/0235306 A1* | 9/2010 | Wagoner | ............ | G06Q 10/1095 706/12 |
| 2011/0078606 A1* | 3/2011 | Hoff | ........................ | G06Q 10/00 715/771 |
| 2011/0313805 A1* | 12/2011 | Heydemann | ........... | G06Q 10/10 705/7.14 |
| 2012/0198547 A1* | 8/2012 | Fredette | .................. | G06F 9/451 726/19 |
| 2013/0173649 A1* | 7/2013 | Chmiel | ............... | G06F 16/9535 707/765 |
| 2013/0304904 A1* | 11/2013 | Mouline | ............... | H04M 3/323 709/224 |
| 2016/0086127 A1* | 3/2016 | Ramkumar | .... | G06Q 10/063118 705/7.17 |
| 2017/0097827 A1* | 4/2017 | Furtado | .................... | G06F 9/445 |
| 2017/0147795 A1* | 5/2017 | Sardesai | ............. | H04L 67/1097 |
| 2017/0236081 A1* | 8/2017 | Grady Smith | ....... | G06Q 10/067 705/7.36 |
| 2017/0257373 A1* | 9/2017 | Furtado | ................. | G06Q 10/107 |
| 2018/0173372 A1* | 6/2018 | Greenspan | .......... | G06F 16/2465 |
| 2018/0174060 A1* | 6/2018 | Velez-Rojas | ............ | G06F 3/013 |
| 2018/0293306 A1* | 10/2018 | Park | ........................ | H04L 51/32 |

* cited by examiner

*Primary Examiner* — Shin-Hon (Eric) Chen
(74) *Attorney, Agent, or Firm* — Buckley, Maschoff & Talwalkar LLC (57) ABSTRACT

A system includes determination and storage of usage data based on the audit data associated with events within the system, determination of a role associated with a user based on metadata of system objects stored in a system database and instance data of the system objects stored in a file repository, determination of usage information associated with the user based on the stored usage data, determination of one or more metrics based on the role and the usage information, and providing of a home page dashboard to the user including the determined one or more metrics.

12 Claims, 7 Drawing Sheets

| User | Event | Event Detail | Event Target | Action ID |
|---|---|---|---|---|
| User1 | Event1 | View | Universe | 0001 |
| User1 | Event2 | Edit | Universe | 0002 |
| User1 | Event3 | Edit | Universe | 0003 |
| User2 | Event4 | View | Report | 0004 |

*FIG. 4*

| User | Connection | UniverseViews | UniverseEdits | DocumentViews |
|---|---|---|---|---|
| User1 | 0 | 1 | 2 | 0 |
| User2 | 0 | 0 | 0 | 1 |

PROFILE-BASED DASHBOARD SYSTEM

BACKGROUND

Database platforms receive, generate, and store data. Users operate reporting tools to access such data and display the data in reports and graphic visualizations. Users also operate platform management tools to define user roles and security restrictions which govern access to the data, and logical abstractions of the data which are used by the reporting tools.

Some tools provide a "welcome" or "home" dashboard which presents one or more metrics based on the stored data. The metrics are often too basic, out-of-date, or irrelevant for the user. Although tools may allow customization of the default dashboard, this customization may be difficult, time-consuming or otherwise inefficient. Systems are needed to efficiently provide useful and/or dynamic information to users upon login to a database platform.

DETAILED DESCRIPTION

The following description is provided to enable any person in the art to make and use the described embodiments. Various modifications, however, will remain readily-apparent to those in the art.

Generally, some embodiments provide an intelligent and automated approach for displaying relevant metrics in a database platform client application. Embodiments may efficiently determine dashboard metrics based on a user's profile, the platform's profile security, and user usage of the database platform.

The database platform may store fine-grained audit data as is conventionally known. Embodiments may generate usage data describing users' usage of the platform based on the audit data. A system database stores platform information, such as user, server, folder, document, configuration, and authentication details, while a file repository stores actual documents/reports including report data. According to some embodiments, the usage data may be combined with information from the system database and file repository via regular relational queries, and the combined data may be used to determine application dashboard content.

Figure 1:
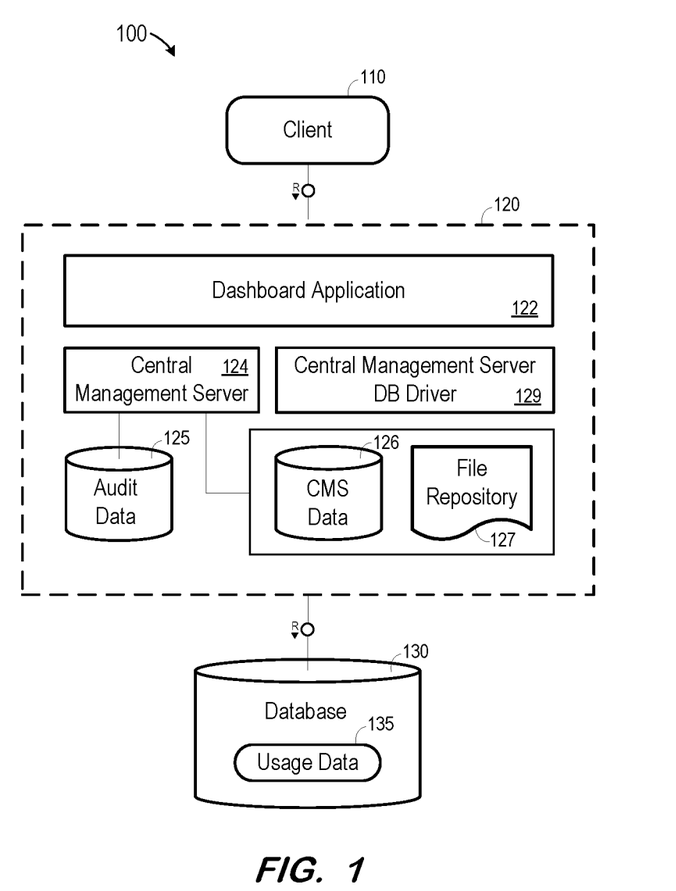
FIG. 1 is a block diagram of a system architecture according to some embodiments.

FIG. 1 is a block diagram of architecture 100 according to some embodiments. Embodiments are not limited to architecture 100. Architecture 100 may operate to detect a user login, determine a role of the user, and determine security rights of the user based on the role. User usage information is then determined, and default dashboard metrics for the user are determined based on the role, security rights and usage information, and presented to the user.

Architecture 100 includes client 110, backend 120 and database 130. Generally, backend 120 executes applications and/or services to receive requests from client 110 and provide results to client 110 based on data stored within database 130. Any, component, service, or resource described herein may consist of any number and types of hardware components and software components, which communicate with one another over any number and type of public (e.g., Internet) or private (e.g., on-premise) networks.

Dashboard application 122 may comprise any application for providing a set of informational metrics to client 110. Dashboard application 122 may comprise a business intelligence application running on a Web application server and providing enterprise data (e.g., sales data, inventory data, human resource data) to clients. Dashboard application 122 may comprise a platform management application for defining and assigning users, roles, user security of backend 120, and/or defining semantic layers based on data stored in database 130.

Such a semantic layer may include a set of objects, each of which is a logical entity associated with one or more physical entities (e.g., a physical database table, associated columns of one or more database tables, etc.) of database 130. These objects may be classified as dimensions, along which an analysis may be performed (e.g., Year, Country, Product), or measures (e.g., Sales, Profit), whose values can be determined for a given combination of dimension values (e.g., 2006, U.S.A., Televisions). In a case that dashboard application 122 is a business intelligence application, a query may be received from client 110 specifying dimensions, dimension values and/or measures. Metadata of the semantic layer is then used to execute the query with respect to the corresponding physical entities of database 130, using a suitable database connector.

Central management server 124 manages services of backend 120. For example, central management server 124 enforces the application of rights at both the folder and object level, and supports inheritance at the user and group level. Central management server 124 monitors user actions and writes such actions to audit data 125. This information may indicate which users accessed the platform, the documents with which they interacted, and overall platform metrics which may be used for platform optimization. According to some embodiments, usage data is generated based on the audit data and is stored in usage data 135 of database 130.

Central management server 124 maintains CMS data 126 including metadata about the platform. The information may include metadata describing, reports, folders, users, groups, security levels, content, services, licenses and object packages. CMS data 126 may store the metadata within RDBMS tables, with central management server 124 handling communication with the RDBMS tables. According to some embodiments, data elements such as an object's ID, type, or GUID, for example, are stored in indexed columns of the tables. Data such as description, output format, printer information, etc., and any custom properties are stored collectively in binary (BLOB) columns and are unindexed.

Central management server 124 also manages file repository 127. File repository 127 contains all reports and other documents that have been created. For example, a user creates a document, and backend 120 retrieves corresponding data from database 130, generates the document, and stores the document in file repository 127.

Central management server 124 tracks object location and maintains the folder hierarchy. Metadata objects stored in the aforementioned RDBMS tables contain index information, and the actual documents or objects are stored in file repository 127. The separation of the object definition (metadata) from the document allows for fast object processing as only the required information is retrieved from the CMS data 126.

Central management server database driver 129 provides the ability to acquire information from CMS data 126 and file repository 127, and to combine this information with information from audit data 125 and/or usage data 135 via a relational query. Central management server database driver 129 translates regular Structured Query Language (SQL) statements (e.g., rows and columns, table-based relationships) into statements corresponding to structures within CMS data 126 and file repository 127 (e.g., objects, blob, non-table-based relationships).

Database 130 may comprise any data source which is or becomes known, including but not limited to database views, spreadsheets, relational databases and/or OLAP cubes. According to some embodiments, new datasets are occasionally stored within database 130, and metadata describing these newly-loaded datasets is incorporated into the above-described semantic layer such that the datasets may be queried as described above.

Figure 2:
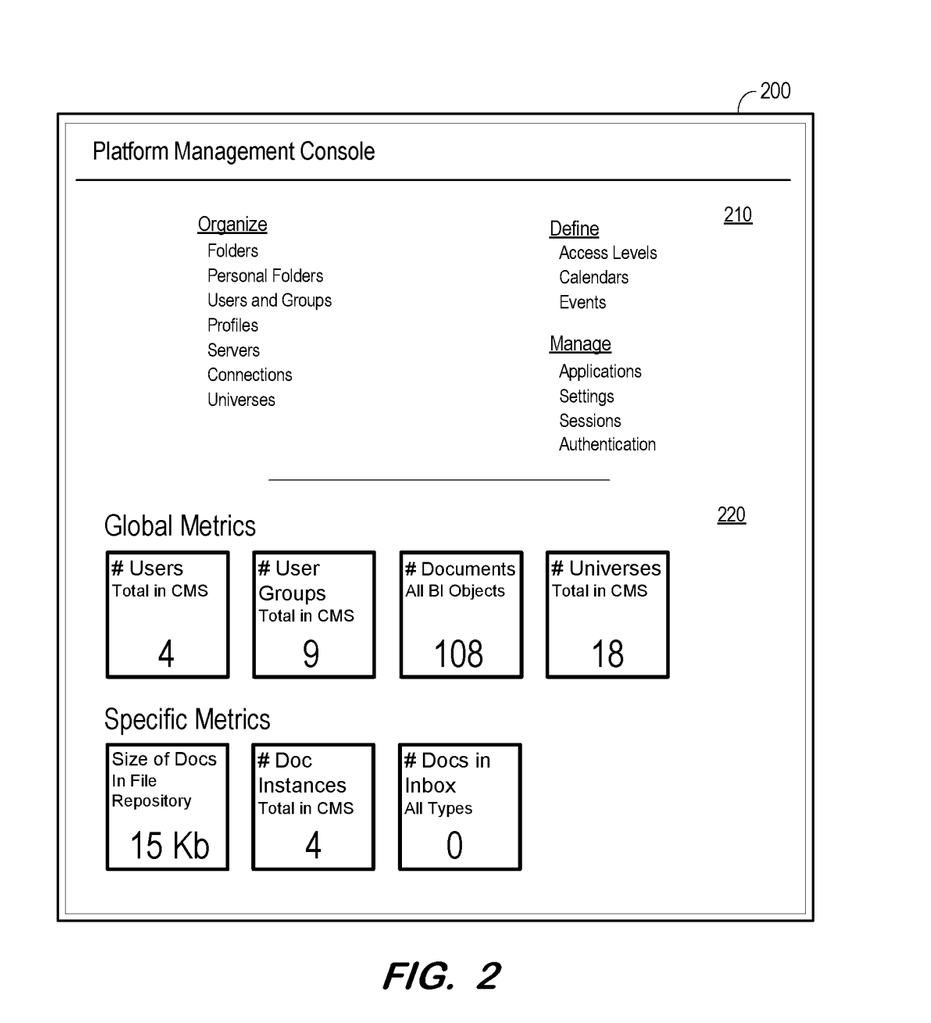
FIG. 2 is a view of a user interface of a client application according to some embodiments.

FIG. 2 illustrates interface 200 of a dashboarding application according to some embodiments. Interface 200 may allow a user to manage aspects of a database platform, including but not limited to users, security and semantic layers (or Universes). Embodiments are not limited to interface 200 or to a platform management application. Interface 200 may comprise a Web page provided by application 122 executing within backend 120 in response to a request from a Web browser application executing on client 110. Any client application may be used to display interface 200, which is not limited to Web-based formats.

Interface 200 includes operational area 210 and dashboard area 220. Operational area 210 includes selectable links for accessing desired functionality of a backend application as is known in the art. Dashboard area 220 includes metrics associated with the backend and/or with stored data of database 130. According to some embodiments, an initial interface (for example, a "Home" page) primarily includes a dashboard area of dashboard metrics, and functionality of the application is accessed via other interfaces.

The metrics of area 220 are determined based on user roles and platform usage according to some embodiments. For example, it is assumed that a user logs on to backend 120 for a first time. Backend 120 determines that the user is an Administrator and has rights to administrate other users and Universes. Accordingly, dashboard area 220 presented to the user may include metrics related to Universes and users. In another example, a user with a Universe Designer role logs on to backend 120 for a first time. Backend 120 determines that the user is a standard user with rights for Universe design. Accordingly, dashboard area 220 presented to the user may include metrics related to Universes.

The determination of metrics in the above examples assumes that little or no usage data has been acquired at the time of determination. However, as described above, audit data 125 specifies user actions over time and usage data 135 is determined therefrom. Therefore, over time, the determination of dashboard metrics may be increasingly influenced by usage data.

Figure 3:
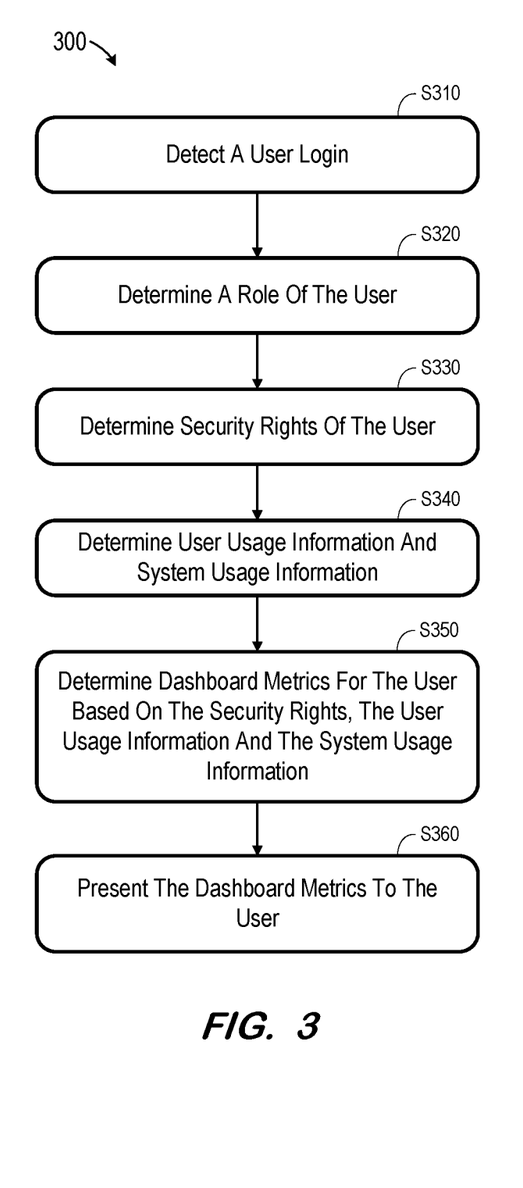
FIG. 3 is a flow diagram of a process according to some embodiments.

FIG. 3 comprises a flow diagram of process 300 according to some embodiments. In some embodiments, processing units (e.g., one or more processors, processing cores, processor threads) of a computing system execute software program code to cause the computing system to perform process 300. Execution of process 300 may be distributed among several computing nodes. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a user login is detected at S310. For example, a user of client 110 may execute a Web browser to issue a request to a Uniform Resource Locator associated with a Web server executing dashboard application 122. The Web server returns a login page to the Web browser, and the user inputs credentials into the login page. The credentials are returned to the Web server to authenticate the user as is known in the art.

Assuming the user is authenticated, a role of the user is determined at S320. Dashboard application 122 may determine the role by querying CMS database driver 129, which acquires role information associated with the user from CMS data 126 and file repository 127. CMS database driver 129 facilitates access to user roles by joining the user activity based on records from CMS data 126 and the audit data for which information is aggregated for objects. For instance, by creating content (e.g., Web Intelligence documents, Universes, Connections, Rights assignments, User creation), a user generates an electronic usage profile, or "fingerprint" of his usage. This usage profile may be considered the user's effective role, as it describes the security rights typically used by the user. The role information of the user may specify any role (e.g., User, Administrator, Manager, Designer) which has been defined within CMS data 126.

Next, security rights of the user are determined at S330. As described above, dashboard application 122 may acquire the security rights from CMS data 126 and file repository 127 by querying CMS database driver 129. User usage information and system usage information are then determined at S340. For purposes of the present description, user usage information refers to usage by the currently logged-in user, and system usage refers to usage by all other users.

Figure 4:
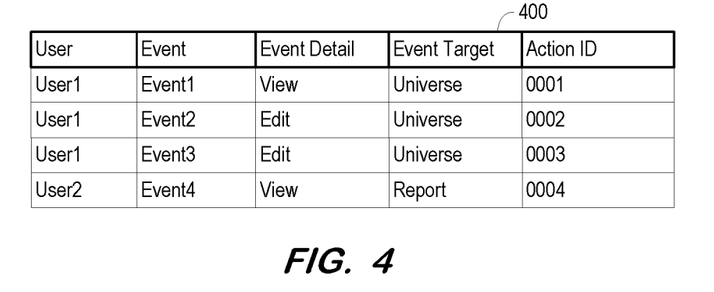
FIG. 4 is a tabular representation of a portion of an audit table according to some embodiments.

Usage information may be generated periodically based on audit data which is being continuously recorded by backend 120 during operation. FIG. 4 illustrates a tabular representation of audit data table 400 according to some embodiments. Each row of audit data table 400 provides details regarding an action performed within backend 120. As shown, audit data table 400 may record actions of multiple users of backed 120. Table 400 may include additional or alternative columns according to some embodiments.

Figure 5:
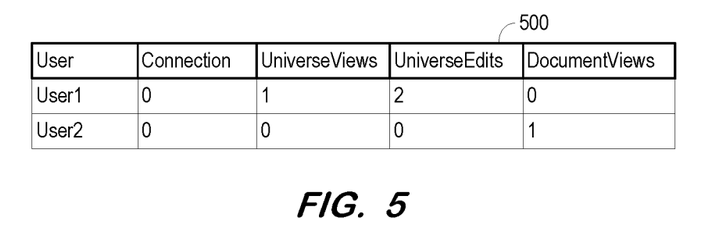
FIG. 5 is a tabular representation of a portion of a usage table according to some embodiments.

The rows of usage data table 500 of FIG. 5 may be generated based on audit data table 400. For example, actions of a user to edit a Universe may result in the generation of many rows of audit data table 400. Based on these rows, a single row of usage data table 500 may be generated (or updated) to indicate this editing.

At S350, dashboard metrics are determined for the user based on the security rights, the user usage information and the system usage information. For example, if a user having a Universe Designer role has previously edited a Universe (e.g., using links provided within operational area 210), actions associated with this editing are recorded within audit data 125, and corresponding usage data 135 is generated. Accordingly, if the user logs in again, or navigates back to the Home page, it may be determined at S350 to display a "recent universes" dashboard metric in addition to a set of default dashboard metrics associated with the Universe Designer role. In other examples, a "Top 5 User tasks" dashboard metric may be determined at S350 based on usage data indicating tasks previously performed by the logged-in user. Other dashboard metrics determined based on security rights and usage data may include "Top 10 Universes" and "Top 10 Users".

Figure 6:
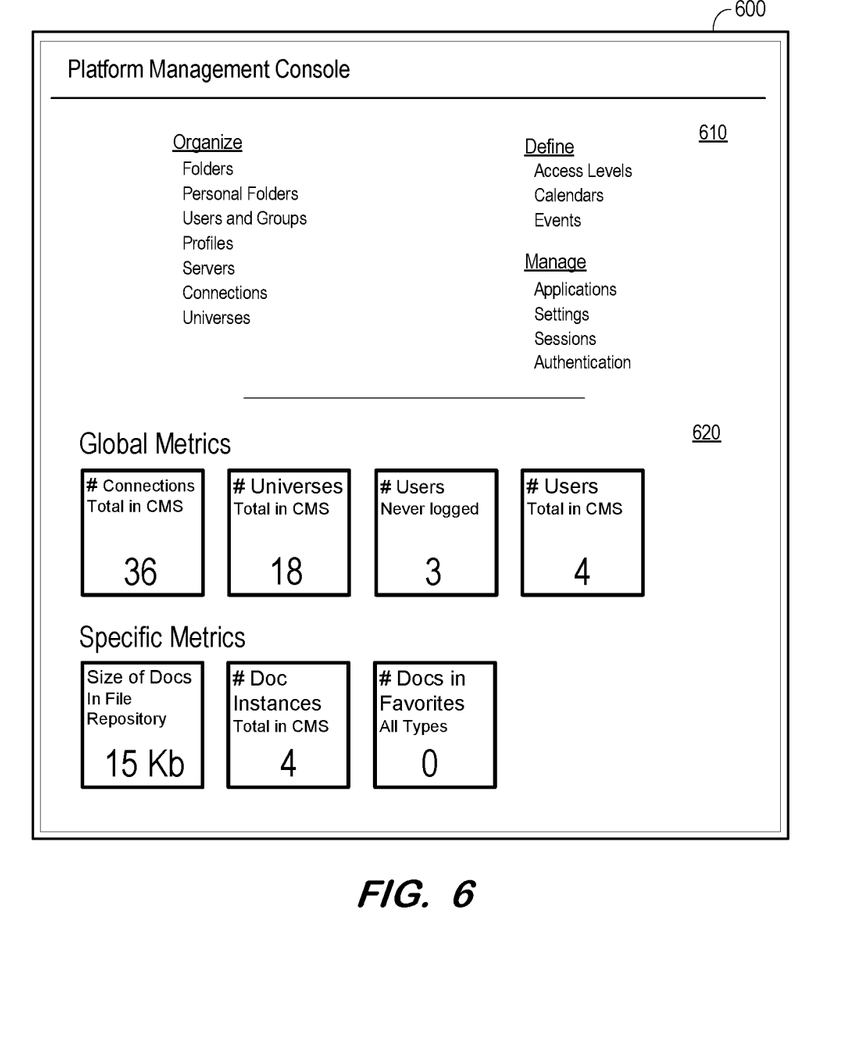
FIG. 6 is a view of a user interface of a client application according to some embodiments.

The determined dashboard metrics are presented to the user at S360, either in response to the login request or upon navigating back to a Home page. In an example of the latter scenario, FIG. 6 illustrates interface 600 showing dashboard metrics in dashboard area 620 which differ from those shown in dashboard area 220 of FIG. 2. According to some embodiments, a user may thereafter manipulate interface 600 to remove metrics from or add metrics to dashboard area 620. These actions may influence a next determination of metrics at S350. Specifically, the actions may be recorded within audit data and reflected in usage data which is used in a subsequent determination of dashboard metrics (e.g., at the user's next login or visit to the Home page).

According to some embodiments, a user may selectively suspend or cease generation of usage data, for example if the user is planning to perform an out-of-the-ordinary task. This action may reduce the influence of the out-of-the-ordinary task on future determinations of dashboard metrics for the user.

Figure 7:
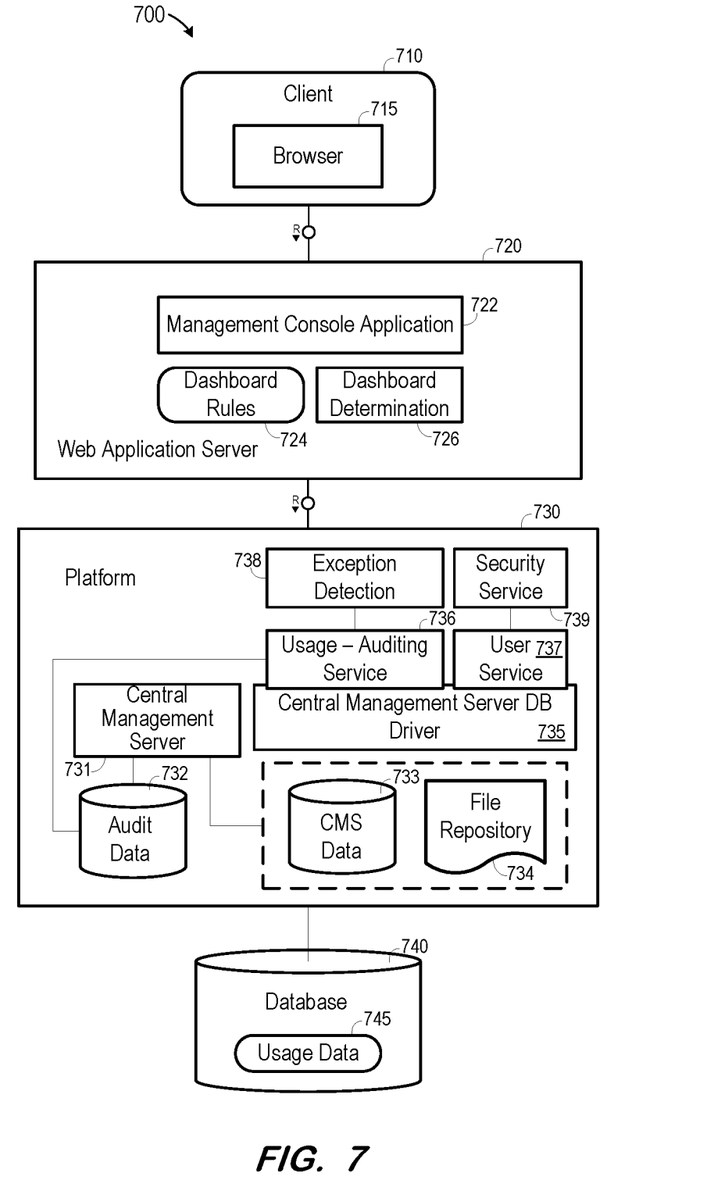
FIG. 7 is a block diagram of a system architecture according to some embodiments.

FIG. 7 is a block diagram of architecture 700 according to some embodiments. Architecture 700 may comprise a specific implementation of architecture 100 of FIG. 1, but embodiments are not limited thereto.

Client 710 executes browser 715 to access management console application 722 executing on Web application server 720. Management console application 722 may provide database platform management functions as described above. In some embodiments, dashboard determination component 726 may receive usage, user role and security information from platform 730 and determine dashboard metrics based on the received information and on dashboard rules 724. Dashboard rules 724 may include, for example, a list of candidate dashboard metrics and criteria specifying usage(s), user role(s) and security information associated with each metric. At S350, dashboard determination component 726 may determine a score for each candidate dashboard metric based on the received usage, user role and security information and on the usage(s), user role(s) and security information associated with each candidate metric. The determined metrics are then presented to the user at S360 in score order.

Platform 730 includes central management server 731, audit data 732, CMS data 733, file repository 734 and driver 735 as described above. Also shown are usage-auditing service 736 and user service 737. Usage-auditing service 736 may generate usage data 745 based on audit data 732 and on user information stored within CMS data 733 and file repository 734. Usage-auditing service 736 may use CMS database driver 735 to access the user information of CMS data 733 and file repository 734. User service 737 may also use driver 735 to access the user information as well as security information a provide the information to security service 739.

Exception detection 738 may operate to determine that a user is performing an out-of-the-ordinary task, based on usage data 735 and/or audit data 732. For example, exception detection 738 may detect that a user has opened a Universe for editing, is not a Universe Designer, and typically administrates documents. Accordingly, the user may be asked if he/she wishes to suspend or cease the generation of usage data, in order to reduce the influence of the out-of-the-ordinary task on future determinations of dashboard metrics for the user.

Figure 8:
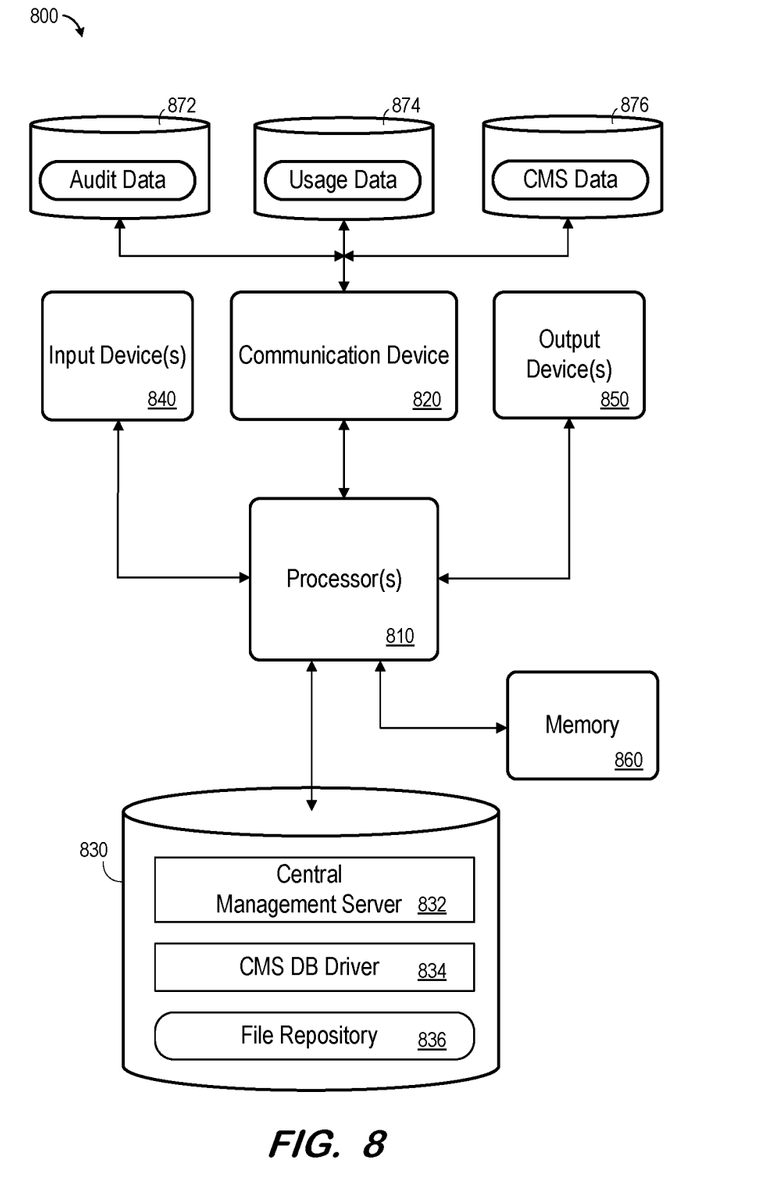
FIG. 8 is a block diagram of a computing system according to some embodiments.

FIG. 8 is a block diagram of system 800 according to some embodiments. System 800 may be composed of general-purpose computer hardware and may execute program code to perform any of the functions described herein. System 800 may comprise an implementation of backend 120 and database 130 and/or of components 730 and 740 of architecture 700 in some embodiments. System 800 may include other unshown elements according to some embodiments.

System 800 includes processor(s) 810 operatively coupled to network interface 820, data storage device 830, one or more input devices 840, one or more output devices 850 and memory 860. Network interface 820 may and facilitate communication with external devices, such as client devices or databases. Input device(s) 840 may comprise, for example, a keyboard, a keypad, a mouse or other pointing device, a microphone, knob or a switch, an infrared (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Central management server 832 and CMS database driver 834 comprise program code and/or libraries executed by processor(s) 810 to cause system 800 to perform any one or more of the processes described herein. File repository 836 stores CMS data in a filesystem as described herein. Audit data, usage data and CMS object data are stored in separate databases 872, 874 and 876 according to the illustrated embodiment.

Data storage device 830 may also store data and other program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
a memory storing processor-executable process steps;
a processor to execute the processor-executable process steps:
an audit database storing audit data associated with events within the system;
a system database storing metadata of system objects;
a file repository storing instance data of the system objects; and
a driver to communicate with the system database and the file repository,
the processor to execute the processor-executable process steps to:
determine and store usage data based on the audit data;
determine a role associated with a user by requesting the role from the driver based on the metadata and the instance data;
determine usage information associated with the user based on the usage data;
determine security rights of the user by requesting the security rights from the driver based on the metadata and the instance data;
determine one or more metrics to present to the user based on the role, the security rights and the usage information; and
provide a home page dashboard to the user including the determined one or more metrics.

2. A computing system according to claim 1, the computing system further to:
determine and store new usage data based on newly-stored audit data;
determine new usage information associated with the user based on the new usage data; and
determine a new one or more metrics to present to the user based on the role and the new usage information.

3. A computing system according to claim 1, the computing system to:
determine a second role associated with a second user based on the metadata and the instance data;
determine second usage information associated with the second user based on the usage data; and
determine a second one or more metrics to present to the second user based on the second role and the second usage information.

4. A computing system according to claim 1, wherein determination of the one or more metrics comprises:
determination of the one or more metrics based on the role, the usage information and a list of candidate metrics, each of the candidate metrics respectively associated with role and usage criteria.

5. A system comprising:
a memory storing processor-executable process steps; and
a processor to execute the processor-executable process steps to cause the system to:
determine and store usage data based on the audit data associated with events within the system;
determine a role associated with a user based on metadata of system objects stored in a system database and instance data of the system objects stored in a file repository, by requesting the role from a driver in communication with the system database and the file repository;
determine usage information associated with the user based on the stored usage data;
determine security rights of the user by requesting the security rights from the driver based on the metadata and the instance data;
determine one or more metrics based on the role, the security rights and the usage information; and
provide a home page dashboard to the user including the determined one or more metrics.

6. A system according to claim 5, the processor to execute the processor-executable process steps to cause the system further to:
determine and store new usage data based on newly-stored audit data;
determine new usage information associated with the user based on the new usage data; and
determine a new one or more metrics based on the role and the new usage information.

7. A system according to claim 5, the processor to execute the processor-executable process steps to cause the system further to:
determine a second role associated with a second user based on the metadata and the instance data;
determine second usage information associated with the second user based on the usage data;
determine a second one or more metrics based on the second role and the second usage information; and
provide a second home page dashboard to the user second including the determined one or more metrics.

8. A system according to claim 5, wherein determination of the one or more metrics comprises:
determination of the one or more metrics based on the role, the usage information and a list of candidate metrics, each of the candidate metrics respectively associated with role and usage criteria.

9. A method comprising:
determining and storing usage data based on the audit data associated with events within the system;
determining a role associated with a user based on metadata of system objects stored in a system database and instance data of the system objects stored in a file repository by requesting the role from a driver in communication with the system database and the file repository;
determining usage information associated with the user based on the stored usage data;
determining security rights of the user by requesting the security rights from the driver based on the metadata and the instance data;
determining one or more metrics based on the role, the security rights and the usage information; and
providing a home page dashboard to the user including the determined one or more metrics.

10. A method according to claim 9, further comprising:
determining and store new usage data based on newly-stored audit data;

determining new usage information associated with the user based on the new usage data; and determining a new one or more metrics based on the role and the new usage information.

11. A method according to claim 9, further comprising:

determining a second role associated with a second user based on the metadata and the instance data;

determining second usage information associated with the second user based on the usage data;

determining a second one or more metrics based on the second role and the second usage information; and providing a second home page dashboard to the user second including the determined one or more metrics.

12. A method according to claim 9, wherein determining the one or more metrics comprises:

determining the one or more metrics based on the role, the usage information and a list of candidate metrics, each of the candidate metrics respectively associated with role and usage criteria.

* * * * *